United States Patent Office.

CLAUDE PAUL FOLLIET, OF AMONCE, FRANCE.

Letters Patent No. 107,027, dated September 6, 1870.

IMPROVEMENT IN COMPOUNDS FOR DESTROYING THE OIDIUM IN VINES, PLANTS, &c.

The Schedule referred to in these Letters Patent and making part of the same.

I, CLAUDE PAUL FOLLIET, of Amonce, in the Department of the Haute Saône, in the Empire of France, merchant, have invented a certain process for Destroying the Oidium in Vines and other Plants, also for destroying parasites between the bark and wood of trees, of which the following is a specification.

Nature and Objects of the Invention.

For many years past the vine has been attacked by a disease termed the oidium. The same disease, inasmuch that it arises from the same causes, reigns among fruit-trees, shrubs, flowers, and all vegetables which undergo transplantation.

This disease is caused by a kind of puceron, grub, or worm, which attaches itself to the roots, eating them away and developing an imperceptible canker, which spreads throughout the plant. These parasites principally inhabit soils destitute of certain salts, and the object of my invention is to restore these salts to the soil and cause these parasites to perish.

Compound.

For the purpose aforesaid, I use a powder compounded of the following substances:

For every two pounds three and one-third ounces (one kilogram) of powder—

|  | Parts or Grams. |
|---|---|
| Sulphur | 350 |
| Soda Salt | 250 |
| Gas Waste | 100 |
| Ashes of vine-cuttings and of oak branches, thoroughly baked | 180 |
| Lime | 50 |
| Animal Charcoal | 20 |
| Ocher | 50 |
| Total | 1.000 |

All these substances, being placed together in an oven suitably heated, are afterward ground and sifted.

Application.

This composition is used in the following proportions or thereabout:

For a trellised vine from five to twenty years old, not trained against a wall, clear the foot of the vine down to the first roots, taking care not to injure these latter; lay the ground open to the extent of about two feet square; sprinkle the bottom of the hole with about three and one-half ounces (one-hundred grams) of the powder, prepared as above, and throw a few pinches about the wood, from the root to about four inches above the level of the soil, cover in, and then spread a little on the ground only around the foot.

If the foot of the vine is against a wall, open the ground in the direction of the roots (which generally run forward) making a hole of about twenty inches in length by sixteen broad, and proceed as before.

For vines less than five years old, whether against a wall or not, use one and three-fourths ounces (fifty grams) of powder, operating as above described.

For vines in the open field, it is only requisite at the time of digging or picking the ground, to slightly free the foot and spread from three-quarters to one ounce (twenty-five to thirty grams) of powder around it, taking care to throw some on the wood exposed; then cover in as above.

For fruit-trees, same operation as for the vine, except for those over ten years old, to which, give five and one-fourth ounces (one hundred and fifty grams) of powder.

For shrubs, rose-trees, and currant and gooseberry bushes, clear to the root as above, and use from one to one and one-half ounce (thirty to forty grams) of powder, according to the thickness of the foot.

For flowers, melons, salads, and various vegetables which undergo transplantation, the hole being made with a dibble, pour in sufficient water to prevent the necessity of watering the plant during the first day; when the water has well soaked in, work the hole again with the dibble or trowel, take a pinch of powder and spread it on the sides of the hole, and then put in the plant, pressing down the roots in the usual manner.

Four of the substances entering into the composition of the aforesaid powder, (mixed in the same manner,) will free fruit trees from the numerous parasites which are found between the bark and the tree.

These substances are lime, sulphur, animal charcoal, and ocher, combined as follows:

For every three and one-half ounces (one hundred grams) of powder—

|  | Parts or Grams. |
|---|---|
| Lime (fat lime) | 50.0 |
| Sulphur | 30.0 |
| Animal Charcoal | 2.5 |
| Ocher | 7.5 |
| Total | 90.0 |

Method of using this Powder.

Take three and one-half ounces (one hundred grams) of this powder and and dilute it with three pints or a little more (one liter, thirty centiliters) of water; free the tree by means of a scraper, from all the diseased bark, under which are the parasites, this being easily recognized by the scales and the swellings on the surface; thoroughly stir the composition, and, by means of a brush, spread the liquid thus prepared, over the parts which have been rasped or scraped.

The effect of this application will be the destruction of all the parasites existing between the wood and the bark of the tree.

Claim.

I claim as my invention—

The preparation or manufacture of a powder, as herein set forth, and its application to vines and other plants, to destroy the oidium; also, the preparation of a powder and its application to the destruction of parasites between the bark and wood of trees, substantially as described.

P. FOLLIET.

Witnesses:
PIERRE GIRARDET,
SEGUIN JOACHIM.